(12) United States Patent
Guinness (10) Patent No.: US 9,622,614 B2
(45) Date of Patent: Apr. 18, 2017

(54) WASTAGE REDUCING DEVICE (76) Inventor: Steven Francis Paul Guinness, Aucklan (NZ)

( * ) Notice: Subject to any disclaimer, the term of this patent is extended or adjusted under 35 U.S.C. 154(b) by 979 days.

(21) Appl. No.: 13/147,302

(22) PCT Filed: Jan. 29, 2010

(86) PCT No.: PCT/NZ2010/000013
§ 371 (c)(1),
(2), (4) Date: Aug. 30, 2011

(87) PCT Pub. No.: WO2011/002308
PCT Pub. Date: Jan. 6, 2011

(65) Prior Publication Data
US 2011/0303321 A1 Dec. 15, 2011

(30) Foreign Application Priority Data
Feb. 1, 2009 (NZ) ........................................ 570241

(51) Int. Cl.
*B65B 1/04* (2006.01)
*A47J 31/44* (2006.01)

(52) U.S. Cl.
CPC ..................... *A47J 31/44* (2013.01)

(58) Field of Classification Search
CPC .................................. B65B 1/04; A47J 31/44
USPC ............ 141/1, 311 R, 331, 358; 99/286, 305
See application file for complete search history.

(56) References Cited

U.S. PATENT DOCUMENTS

| | | | | |
|---|---|---|---|---|
| 1,175,709 A * | 3/1916 | Cole | ..................... | G01F 19/002 30/326 |
| D120,759 S * | 5/1940 | O'Bryon | ..................... | D10/46.3 |
| 2,278,754 A * | 4/1942 | Wolcott | ................ | A47J 31/043 141/331 |
| 2,451,195 A * | 10/1948 | Brown | ................ | A47J 31/0663 99/295 |
| 2,459,466 A * | 1/1949 | Spreen | ................... | G01F 19/002 30/128 |
| 2,525,005 A * | 10/1950 | Taliaferro | ................ | A47J 31/44 248/315 |
| 2,569,179 A * | 9/1951 | Lanchart | ................ | A47G 21/04 210/465 |
| 3,137,879 A * | 6/1964 | Dootson | ................ | A45D 27/04 15/245.1 |
| 4,232,718 A * | 11/1980 | Wippermann | ......... | A47G 19/34 141/358 |
| 4,607,200 A | 8/1986 | Zimmerman | | |
| 4,624,177 A * | 11/1986 | Ito | ........................... | A47J 31/42 241/101.2 |
| 4,644,856 A * | 2/1987 | Borgmann | .......... | A47J 31/4464 210/455 |
| 4,714,206 A | 12/1987 | Nidiffer et al. | | |

(Continued)

FOREIGN PATENT DOCUMENTS

DE 2525426 12/1976
EP 1092376 A2 * 4/2001 .......... A47J 31/0668

(Continued)

*Primary Examiner* — Timothy L Maust
*Assistant Examiner* — Andrew Schmid (57) ABSTRACT

The invention provides a device for aiding the transfer of coffee grounds from a grinder and/or for reducing the wastage of coffee grounds including during such transfer. The device comprises at least one wall portion for guiding the coffee grounds.

6 Claims, 6 Drawing Sheets

(56) References Cited

U.S. PATENT DOCUMENTS

| | | | | |
|---|---|---|---|---|
| 4,787,299 A | * | 11/1988 | Levi | A47J 31/0657 99/285 |
| 4,813,622 A | | 3/1989 | Nidiffer et al. | |
| D339,992 S | * | 10/1993 | Goldman | D10/46.2 |
| 5,343,799 A | | 9/1994 | Fond | |
| 5,347,916 A | | 9/1994 | Fond et al. | |
| 5,386,944 A | * | 2/1995 | Knepler | A47J 42/50 241/135 |
| 5,611,261 A | * | 3/1997 | Pope | A47J 31/40 210/771 |
| 5,643,165 A | | 7/1997 | Klekamp | |
| 5,865,095 A | | 2/1999 | Mulle | |
| 5,897,019 A | * | 4/1999 | Stropkay | B65D 17/161 206/519 |
| 6,220,147 B1 | * | 4/2001 | Priley | A47J 31/0615 99/299 |
| 6,488,976 B1 | * | 12/2002 | Priley | A23F 3/18 426/425 |
| 6,948,668 B2 | | 9/2005 | Mazzer | |
| 6,974,056 B2 | * | 12/2005 | Rea | G01F 19/002 222/460 |
| 8,240,244 B2 | * | 8/2012 | McKnight | A47J 31/44 15/236.05 |
| 2003/0072859 A1 | * | 4/2003 | Priley | A23F 3/18 426/435 |
| 2004/0237794 A1 | * | 12/2004 | Fulgoni | A47J 31/0668 99/279 |
| 2005/0005774 A1 | * | 1/2005 | Fulgoni | A47J 31/4496 99/275 |
| 2005/0279219 A1 | * | 12/2005 | Turi | A47J 42/16 99/286 |
| 2008/0302252 A1 | * | 12/2008 | O'Brien | A47J 31/005 99/302 R |
| 2010/0112164 A1 | * | 5/2010 | Taylor | A47J 31/02 426/432 |
| 2011/0209623 A1 | * | 9/2011 | Leung | A47J 31/44 99/287 |
| 2011/0283889 A1 | * | 11/2011 | Con | A47J 31/42 99/286 |
| 2011/0303321 A1 | * | 12/2011 | Guinness | A47J 31/44 141/1 |
| 2012/0213891 A1 | * | 8/2012 | Simone | B65D 85/808 426/82 |
| 2012/0247341 A1 | * | 10/2012 | Yip | A47J 31/46 99/300 |
| 2013/0042764 A1 | * | 2/2013 | Tahincioglu | A47J 31/20 99/281 |
| 2013/0167729 A1 | * | 7/2013 | Hoare | A47J 31/44 99/280 |
| 2014/0090565 A1 | * | 4/2014 | Yang | A47J 31/0663 99/323 |
| 2014/0123857 A1 | * | 5/2014 | Rego | A47J 42/38 99/280 |
| 2014/0216266 A1 | * | 8/2014 | Ruhl | A47J 31/0663 99/300 |

FOREIGN PATENT DOCUMENTS

| | | | |
|---|---|---|---|
| JP | 04-097715 | 3/1992 | |
| NZ | 337539 | 4/2001 | |
| NZ | 504664/504690 | 5/2003 | |
| NZ | 548604 | 2/2008 | |
| WO | WO 9743937 A1 * | 11/1997 | .......... A47J 31/0647 |
| WO | WO 2006082064 A1 * | 8/2006 | .......... A47J 31/0668 |

* cited by examiner

WASTAGE REDUCING DEVICE

PRIORITY CLAIM

This application is a national phase entry of PCT/NZ2010/000013 filed Jan. 29, 2010, which claims priority to New Zealand Application Serial No. 570241 filed Feb. 1, 2009, the contents of which are hereby incorporated by reference.

FIELD OF THE INVENTION

The present invention pertains to a tool or device that is used to reduce food and beverage particle wastage and/or to aid the transfer of the food and/or beverage.

Preferred embodiments pertain to a tool that is used to aid the transfer of coffee grounds from a grinder in a coffee preparation process and/or to reduce wastage of coffee grounds including during such transfer.

BACKGROUND OF THE INVENTION

Wastage can occur when transferring food products from one stage of a preparation process to the next stage. This wastage can result in loss of product and can also result in a mess being produced. In private use such a mess may require time to clean up. In an industrial setting, messy processes are undesirable as there is loss of product which may result in loss of profit. In addition, time must be spent cleaning the mess resulting from the process in order to maintain a work area that will meet health and safety regulations and reassure customers that the food preparation and work area meets such health and safety regulations.

Wastage in transferring ground coffee beans is a significant problem in the beverage industry (including but not limited to commercial, private, personal and domestic use).

One particular instance where coffee grounds are transferred and may result in wastage, is the transfer of coffee grounds from a grinder to a portafilter. A portafilter is a device which attaches to an espresso or other coffee-making machine which carries a puck of coffee grounds. A seal is made between the coffee machine and the portafilter which then allows high pressure hot water and steam to pass through the coffee grounds. The size of the portafilters may vary depending on the attachment fittings of different makes of coffee machine. However, in general, the size of a portafilter is adapted to carry sufficient coffee grounds to make a serving of coffee and are therefore generally of approximately a similar size, as would be apparent to a person skilled in the art.

Another example of an instance where coffee grounds are transferred and may result in wastage is the transfer of coffee grounds to a filter of a stove top espresso maker, coffee percolator or other coffee-making machines or apparatus.

Devices exist which reduce ground bean wastage including: automated dosage devices and automated or mechanically assisted tamps. These devices are all configured as part of a coffee bean grinder. Therefore they are expensive (requiring purchase of a whole new device) and they affect the "standard" coffee-making process, which means that the end result of the coffee can be poor quality.

One transferring method that exists is used after wastage has been created. This is a manual process where a mat is used. Excess ground beans fall onto a mat and, as necessary, a person may dispose of or transfer the excess back into the grinder for re-use. This "excess" is what the so called "wastage" is. When re-used, it results in poorer quality coffee because the ground coffee beans are then subjected to greater exposure to the environment.

Therefore there is a need for a device that overcomes or at least ameliorates these limitations or problems.

OBJECTS OF THE INVENTION

An object of the present invention is to provide a device and/or a method to reduce wastage of freshly ground coffee used in a coffee-making machine, such as an espresso machine.

An alternative object is to provide a device and/or a method for aiding the transfer of coffee grounds from a grinder and/or for reducing the wastage of coffee grounds including during such transfer.

An alternative object is to provide a device that can be readily retro-fitted to or otherwise used with existing coffee-making machines and processes.

An alternative object is to overcome or ameliorate the disadvantages of the prior art or at least to provide the public with a useful alternative.

STATEMENTS OF THE INVENTION

According to a first aspect of the invention, there is provided a device for aiding the transfer of coffee grounds from a grinder and/or for reducing the wastage of coffee grounds including during such transfer, the device comprising at least one wall portion for guiding the coffee grounds.

Preferably the at least one wall portion comprises a first end and a second end, wherein the first end is adapted to receive the coffee grounds.

Preferably the first end receives the coffee grounds from a coffee grinder.

Preferably the second end is adapted to deliver the coffee grounds to a portafilter or other coffee-making apparatus.

Preferably the second end is adapted to mate or engage with the portafilter or other coffee-making apparatus.

Preferably the wall portion is inclined.

Preferably the wall portion is inclined such that it is at an angle of less than 90° and greater than 0° from vertical, in use.

Preferably the angle is less than 80° and greater than 10° from vertical, in use.

More preferably, the angle is between approximately 30° and 60° from vertical, in use.

As will be appreciated, the wall portion will have first and second major opposing faces with grounds being guided by the first face. The aforementioned angles relate primarily but not exhaustively to the first face. It will be appreciated that the orientation of the second face may differ. For example the second face may be configured to be substantially vertical in use.

Preferably the wall portion varies in height and/or has one or more cut out portions.

Thus, the wall portion(s) may provide an endless wall that substantially circumscribes a receptacle into which the grounds are to be fed in use, or include a cut away section, such that the wall does not fully circumscribe the receptacle. For example, the wall portions(s) may define a substantially C-shaped wall when viewed from above.

Preferably the first end and second end of the wall portion each define substantially the same profile but of differing dimensions i.e. the plan view from above is preferably substantially the same as that from below subject to differences in size caused by sloping of at least the first face.

Alternatively the first end and second end of the wall portion may each define different profiles.

Preferably the wall portion defines a frustoconical or conical ring shape.

Preferably the wall portion comprises one or more rims proximate the second end thereof for mating to a portafilter or other coffee-making device.

More than one rim may be configured in a stepped formation on a single or opposite faces of the wall portion may be provides. Alternatively, a single rim may be provided on each face. Such arrangements may enable the device of the invention to engage with different size or types of portafilter or other coffee-making apparatus.

Preferably the device comprises a handle.

Preferably the handle is coupled at a first end to the wall portion.

Preferably the handle has one or more bends.

Preferably at least a portion of the handle substantially abuts the portafilter or other coffee-making apparatus when in use. More preferably at least a portion of the handle substantially abuts the handle of a portafilter, in use. Such an arrangement may enable a user to maintain the device in position relative to a portafilter using a single hand and may be achieved by inclusion of the one or more bends.

Preferably the device is rotatably attached to the portafilter or other coffee-making apparatus.

Preferably the handle of the device is rotatably attached to the portafilter or other coffee-making apparatus.

According to a second aspect, there is provided a scraper for removing excess coffee grounds from a receptacle, such as the cup of a portafilter for a coffee-making machine.

Preferably the scraper includes any one or more of the features of the device of the first aspect.

According to a third aspect there is provided a method for aiding the transfer of coffee grounds from a grinder and/or for reducing the wastage of coffee grounds including during the transfer the method comprising:

substantially abutting a device to a portafilter or other coffee-making apparatus, the device comprising at least one wall portion for guiding the coffee grounds.

Preferably the method includes feeding coffee grounds into a first end of the device Preferably the device is in accordance with the device of the first and/or second aspect.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENT

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

Figure 1:
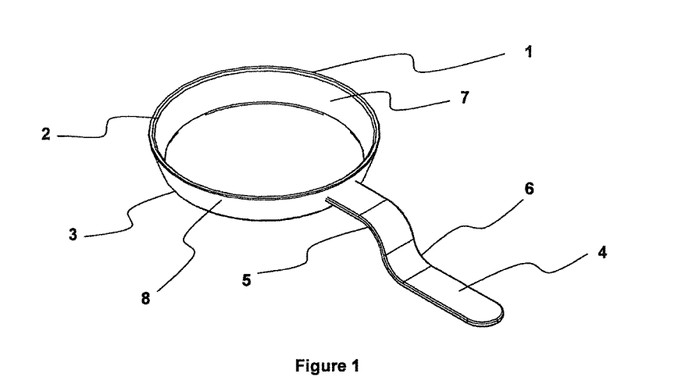
FIGS. 1-3 are perspective, side and plan views, respectively, of one embodiment.
Figure 2:
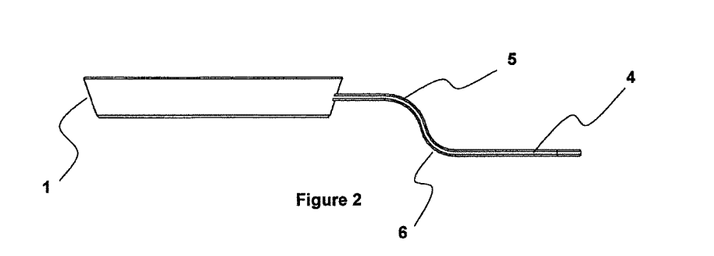
Figure 3:
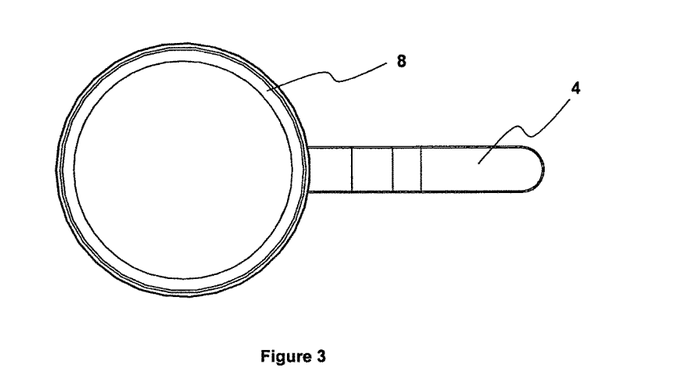
Figure 4:
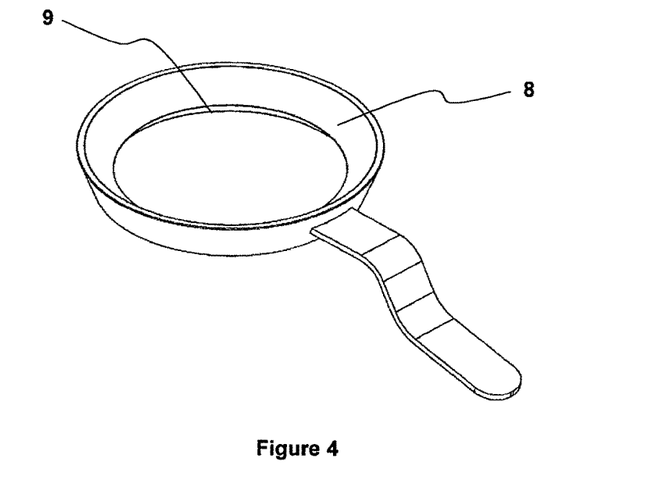
FIGS. 4-7 are above perspective, sectional, plan and underneath perspective views, respectively, of an alternative embodiment.
Figure 5:
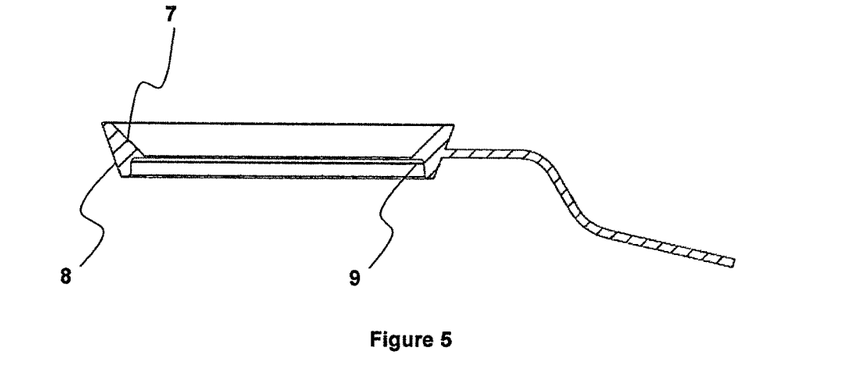
Figure 6:
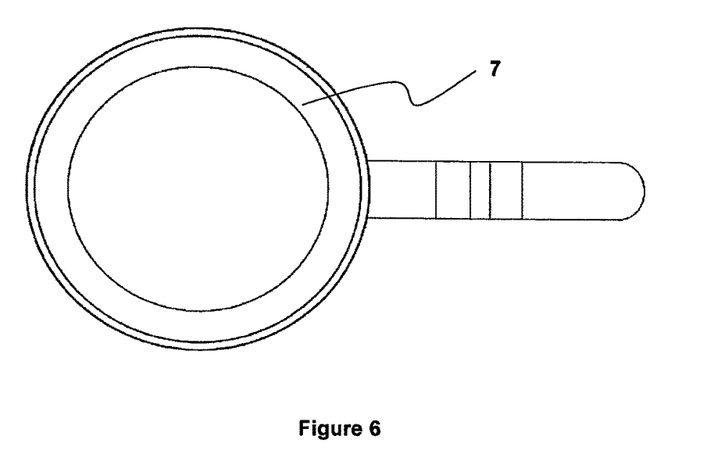
Figure 7:
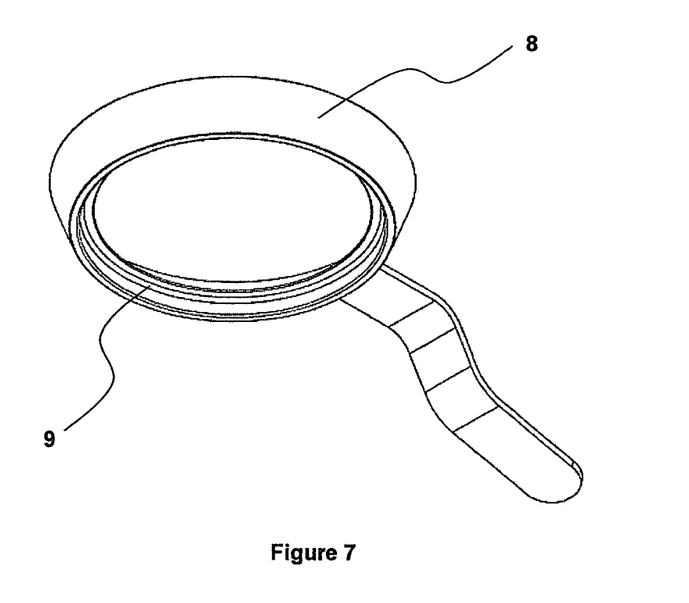

With reference to FIGS. 1, 2 and 3, the device consists of a wall portion 1 for guiding coffee grounds, which, in the preferred embodiment shown, forms a conical ring or frustoconical shape. The wall portion may form other shapes such as for example a square, elliptical or rectangular shape when viewed from above or below, or other non-polygonal shapes.

The wall portion has a first end 2 and a second end 3. The first end is adapted in size and shape to receive coffee grounds. In a preferred example the first end of the wall portion 2, may receive coffee grounds from a coffee grinder. In such an example, the size and shape of the first end of the wall portion 2 will be chosen to engage with or be placed in close proximity to the outlet of the coffee grinder to substantially receive all coffee grounds processed and released from a grinder. Grinder arrangements will be apparent to a person skilled in the art. The second end of the wall portion 3 is adapted to deliver the coffee grounds to a portafilter or other coffee-making apparatus. The size and shape of the second end of the wall portion may be chosen to engage with the portafilter or other coffee-making device. The dimensions and shape of which will be apparent to a person skilled in the art.

It will be appreciated that a grinder may be located remote from the coffee-making machine, with the device of the invention used to guide pre-ground coffee into a portafilter or the like.

The height of the wall portion 1 may be chosen to adapt to the situation of use. For example, if the coffee grounds are guided from a coffee grinder to a portafilter the height of the device may be adapted to fit in the space available under the outlet of the grinder and above the portafilter.

In the preferred embodiment shown, the first end 2 of the wall portion and the second end 3 of the wall portion have substantially the same profile when viewed from above or below as applicable, such that they both form a circle, but are of differing dimensions. However, the first and second ends of the wall portion may define different profiles such as for example, a circle and an ellipse, or a square and a circle.

In the preferred embodiment shown, the wall portion 1 is inclined, such that the first end of the wall portion 2 has a larger profile than the second end of the wall portion 3. The angle of incline is chosen to guide the coffee grounds, from for example a coffee grinder to a portafilter or other coffee-making device.

The wall portion has a first major face 7 and a second major face 8. The coffee grounds are guided by the first major face.

In the preferred embodiment shown, the device comprises a handle 4 attached at a first end to the wall portion 1. It will be readily apparent that a handle is not an essential feature of the invention. In preferred embodiments the handle abuts the portafilter or other coffee-making device into which coffee grounds are being transferred. To enable the handle to abut the portafilter or other coffee-making device when in use, the handle may include one or more bends. In the embodiment shown, the handle includes a first bend 5 and a second bend 6. The second bend allows the second end of the handle to lie flat atop the handle of a portafilter or other coffee making device. In such an arrangement the user may hold the device in position above a portafilter with a single hand. The device can alternatively be rotatably attached to the portafilter or other coffee making device. Preferably the handle of the device may be rotatably attached to the handle of a portafilter. In such an arrangement the device may be rotated into position when in use and rotated out of position when the portafilter is attached to the espresso machine. Thus, the device may be coupleable to a portafilter but moveable from a first position in which it is positioned for guiding coffee grounds into a portafilter to a second position in which the device is clear of the operational portion of the portafilter, enabling the portafilter to be coupled to a coffee-making machine. Alternatively the device may be attached to a coffee grinder.

In a preferred embodiment of the device, the wall portion may comprise one or more rims. With reference to FIGS. 4-7 a preferred embodiment is shown the wall portion comprises a rim 9. The rim is configured to mate or engage to a portafilter or other coffee-making device. In the preferred embodiment shown the rim recesses into the wall portion allowing the coffee grounds to be guided without encumbrance by any form of lip where the device meets with the portafilter or other coffee-making device. Thus, preferably, the rim 9 overhangs the upper edge of a portafilter.

Rim 9 is shown as being provided on first face 7 but may alternatively be provided on second face 8.

Figure 8:
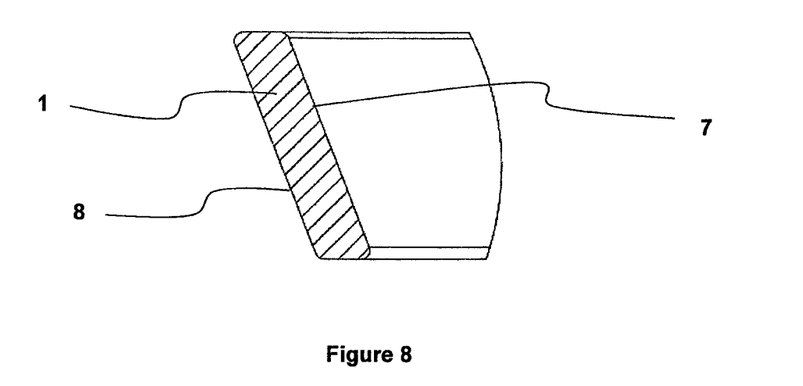
FIG. 8 is a sectional view of the wall portion of the embodiment of FIGS. 1-3.

With reference to FIG. 8, a sectional view of the embodiment of FIGS. 1-3 is shown without a rim and where the first major face 7 of the wall portion 7 and second major face 8 of the wall portion have the same incline.

Figure 9:
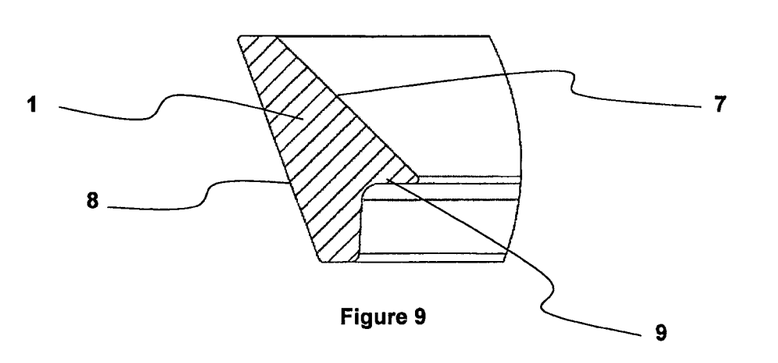
FIG. 9 is a sectional view of the wall portion of the embodiment of FIGS. 4-7.

In FIG. 9, a sectional view of the embodiment of FIGS. 4-7 is shown where the wall portion 1 comprises a rim 9 and the first major face 7 of the wall portion has a different angle of incline to the second major face 8 of the wall portion.

In the embodiments shown, the device is configured to sit on top of a portafilter or the like. Alternative attachment and fixing options (not shown) include flanges, clips, magnets, adhesives, rubbers, and other connecting mechanisms that may assist with holding and releasing the device during use. Also, the device of invention may indirectly couple to a portafilter or the like, and may be spaced apart therefrom in operational use when transferring coffee grounds. The only essential requirement is that, in use, the device serves to improve the flow or transfer of coffee grounds to a desired destination such as the cup of a portafilter.

Figure 10:
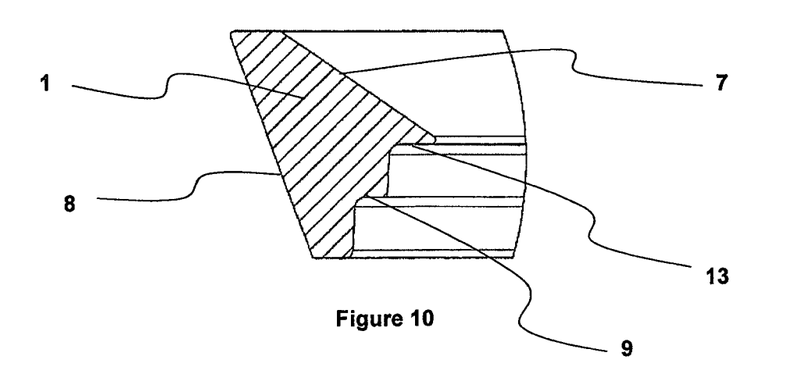
FIG. 10 is a sectional view of the wall portion of an alternative embodiment.

In FIG. 10, a section view of an alternative embodiment is shown where the wall portion 1 comprises a first rim 9 and a second rim 13. Multiple rims may be incorporated into the device to enable the device to engage with different sizes of portafilter or other coffee-making apparatus. The rims in the embodiment are shown configured in a stepped formation on the first major face of the wall portion. However, it will be apparent to a person skilled in the art, the rims could additionally or alternatively be arranged on the second major face of the wall portion 8 or on both faces of the wall portion. This includes the provision of a sole rim on the second face.

Whereas, the embodiments shown in FIGS. 9 and 10 have stepped configurations where the device engages a portafilter or the like, the invention is not limited thereto. For example, the face(s) configured to engage a portafilter may be sloped at the engaging portion. The sloping may be substantially linear or curved. Thus, referring to FIG. 10, the face may slope in a straight or (convex or concave) curved line from the edge of the first rim to the edge of the second rim and to the lower edge thereof. As will be appreciated, any combination of sloped/stepped configurations may be used, as desired. The use of sloped engaging faces helps in enabling users to guide the device onto the portafilter or the like and also enable it to fit to portafilters of any size, between upper and lower limits.

Figure 11:
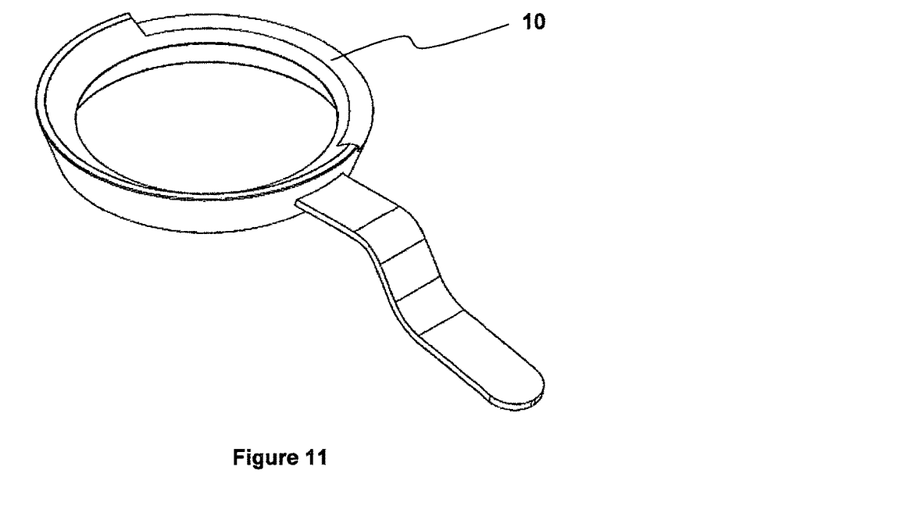
FIGS. 11-13 are perspective views of further alternative embodiments.
Figure 12:
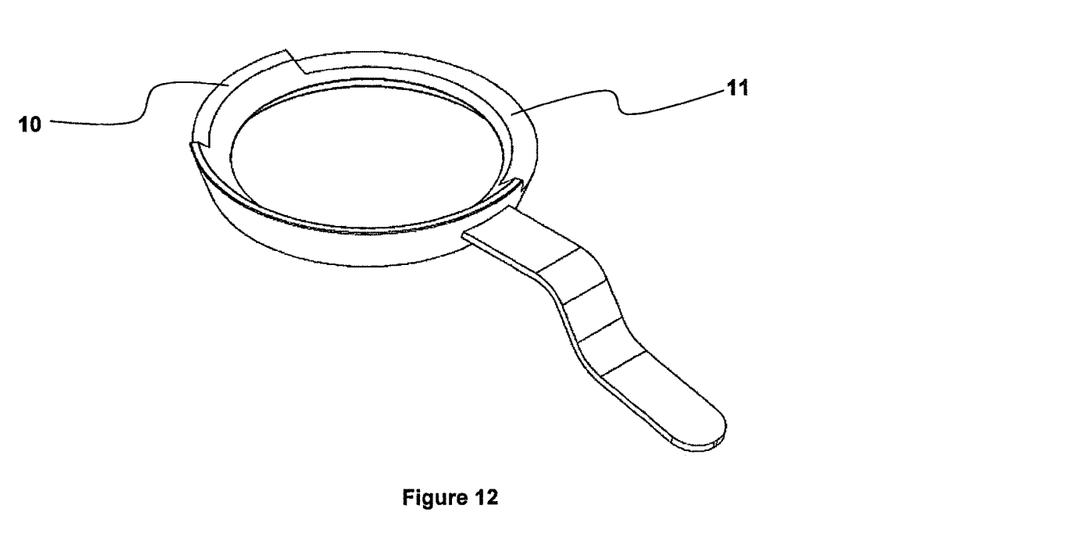

The wall portion 1 of the device may vary in height and/or have one or more cut out portions. With reference to FIGS. 11 and 12, embodiments of the device are shown with a first cut out portion 10 and first and second cut out portions 10 and 11, respectively. Such cut out portions may allow the device to fit within the space allowed to receive the coffee grounds, such as for example the space between a coffee grinder and a portafilter positioned to receive the grounds. The addition of one or more cut out portions may allow the device to fit within the space available when using different coffee-making apparatuses.

Figure 13:
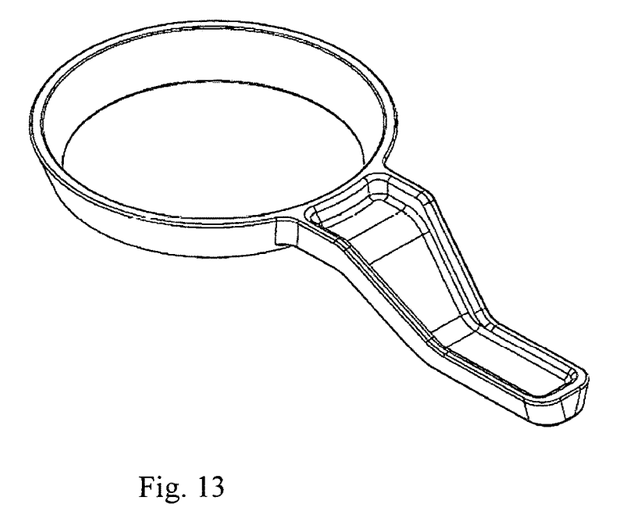

The device may be manufactured from a range of materials including food grade metals, plastics and composites. FIG. 13 shows an injection moulded device of the invention.

An additional advantage of the device is that it may be used to smooth the surface of overfill of coffee grounds once collected in the portafilter or other coffee-making device by moving the device across the surface of the portafilter or other coffee-making device to remove excess coffee bean grounds. Preferably this should be done over the entrance to the coffee grinder so that the grounds can then be reused.

In order to maintain optimum quality, grounds should be used as soon as they are ground, and should not touch other surfaces that will expose the coffee to harsh environments. The device allows all ground coffee beans to be captured on exit from a grinder and the overfill portion of grounds can be pushed back into the container, capturing potential wastage.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The embodiments of the invention in which an exclusive property or privilege is claimed are defined as follows:

1. A device for use in combination with a portafilter that aids in transferring of coffee grounds into a portafilter basket thereby reducing coffee ground waste during such transfer, the device comprising:
   a ring shaped guide portion for directing coffee grounds towards the portafilter basket, wherein the ring shaped guide portion comprises an upper end and a lower end, wherein the upper end funnels the coffee grounds into the portafilter basket and the lower end comprises at least one cut out portion which allows the ring shaped guide portion lower end to mate and engage with a top rim of the portafilter basket;
   wherein the ring shaped guide portion defines a frustoconical surface, the frustoconical surface extending between the upper end and the lower end of the ring shaped guide portion, the lower end of the ring shaped guide portion circumscribes the top rim of the portafilter basket when the lower end of the ring shaped guide portion is mated and engaged with the portafilter basket; and
   wherein opposing sides of the frustoconical surface are spaced further apart at the upper end of the ring shaped guide portion than at the lower end of the ring shaped guide portion; and
   a handle attached to the ring shaped guide portion.

2. The device of claim 1, wherein the handle further comprises at least one bend, the bend is such that the handle of the device that aids transfer of coffee grounds touches a handle of the portafilter when the tower end of the ring shaped guide portion is mated and engaged with the top rim of the portafilter basket.

3. The device of claim 1, wherein the ring shaped guide portion lower end further comprises a plurality of different sized cut outs, each of the plurality of cut outs is adapted to mate and engage with a respective top rim of a different sized portafilter basket.

4. The device of claim 1, wherein the ring shaped guide portion upper end comprises an upper end cut out portion, the upper end cut out portion adapted to allow the device to fit within a space allowed to receive coffee grounds.

5. A method of using a device to aid the transfer of coffee grounds into a portafilter basket thereby reducing coffee ground waste during such transfer, the method comprising:
    mating and engaging a device as claimed according to claim 1 with a portafilter basket, and feeding coffee grounds into the upper end of the device.

6. The method of claim 5, wherein after the coffee grounds are fed into the upper end of the device, moving the device across the top rim of said portafilter basket to remove excess coffee grounds.

\* \* \* \* \*